United States Patent
Lim et al.

(10) Patent No.: US 9,941,529 B2
(45) Date of Patent: Apr. 10, 2018

(54) ACTIVATION APPARATUS OF FUEL CELL STACK

(71) Applicant: Hyundai Motor Company, Seoul (KR)

(72) Inventors: Junhong Lim, Seoul (KR); Daekeun Chun, Seoul (KR)

(73) Assignee: Hyundai Motor Company, Seoul (KR)

( * ) Notice: Subject to any disclaimer, the term of this patent is extended or adjusted under 35 U.S.C. 154(b) by 356 days.

(21) Appl. No.: 14/734,744

(22) Filed: Jun. 9, 2015

(65) Prior Publication Data

US 2016/0164119 A1     Jun. 9, 2016

(30) Foreign Application Priority Data

Dec. 8, 2014  (KR) ........................ 10-2014-0175101

(51) Int. Cl.
*H01M 8/02* (2016.01)
*H01M 8/04* (2016.01)
*H01M 8/043* (2016.01)
*H01M 8/04537* (2016.01)

(52) U.S. Cl.
CPC ....... *H01M 8/043* (2016.02); *H01M 8/04559* (2013.01); *H01M 2250/20* (2013.01); *Y02T 90/32* (2013.01)

(58) Field of Classification Search
CPC ........ H01M 8/02; H01M 8/04; H01M 9/0488; H01M 8/04298; H01M 8/043; H01M 8/04539

See application file for complete search history.

(56) References Cited

U.S. PATENT DOCUMENTS

| | | | |
|---|---|---|---|
| 2002/0025467 A1* | 2/2002 | Staats, III | A63H 29/22 |
| | | | 429/417 |
| 2005/0100767 A1* | 5/2005 | Stolmar | B60L 11/1822 |
| | | | 429/505 |
| 2009/0075152 A1* | 3/2009 | Horji | B62K 5/027 |
| | | | 429/444 |

FOREIGN PATENT DOCUMENTS

| | | |
|---|---|---|
| JP | 2003-151613 A | 5/2003 |
| JP | 2010-061831 A | 3/2010 |
| JP | 4978469 B2 | 7/2012 |

OTHER PUBLICATIONS

Machine Translation of: JP 2010/061831A, Tominaga et al., Mar. 18, 2010.*
Machine Translation of: JP 2003/151613A, Yoshimoto et al. May 23, 2003.*

* cited by examiner

*Primary Examiner* — Kenneth J Douyette
(74) *Attorney, Agent, or Firm* — Mintz Levin Cohn Ferris Glovsky and Popeo, P.C.; Peter F. Corless

(57) ABSTRACT

An activation apparatus of a fuel cell stack is provided. The activation apparatus of a fuel cell stack which is provided to perform activation and evaluate performance of the fuel cell stack while the fuel cell stack enters a frame. The apparatus includes an output cable connecting unit that is movably installed back and forth along a side direction of the fuel cell stack in a motor operated manner, and is configured to connect an output cable with the fuel cell stack.

11 Claims, 16 Drawing Sheets

ACTIVATION APPARATUS OF FUEL CELL STACK

CROSS-REFERENCE TO RELATED APPLICATION

This application claims priority to and the benefit of Korean Patent Application No. 10-2014-0175101 filed in the Korean Intellectual Property Office on Dec. 8, 2014, the entire contents of which are incorporated herein by reference.

BACKGROUND (a) Field of the Invention

The present invention relates to a system for activating a fuel cell stack, and more particularly, to an activation apparatus of a fuel cell stack which enables an activating process of the fuel cell stack and a performance evaluation to be unmanned and automated.

(b) Description of the Related Art

Generally, a fuel cell includes an electrode that provokes an electrochemical reaction between fuel and oxidizing agent, a polymer electrolyte membrane that transfers protons generated by the reaction, and a separator that supports the electrode and the polymer electrolyte membrane. Currently, the polymer electrolyte fuel cell is commonly being used as the fuel cell for vehicles. The polymer electrolyte fuel cell has the advantage of not corroded and regulation of electrolyte is not required, since it has higher efficiency than other forms of fuel cells, the current density and the output density are high, it uses a polymer electrolyte, and the startup time is substantially reduced.

In addition, since the polymer electrolyte fuel cell is an environmentally friendly power source that produces no exhaust emissions except pure water research is being conducted in the field. Such an electrolyte fuel cell may generate electrical energy while generating water and heat through the electrochemical reaction between a fuel including hydrogen and an oxidizing agent such as air.

In other words, in the electrolyte fuel cell, supplied fuel is divided into hydrogen ions and electrons in the catalyst of the anode electrode, and the divided hydrogen ions cross over to the cathode through the polymer electrolyte membrane to generate electrical energy and produce water from the combination of the supplied oxidizing agent and electrons are injected along external wires. In an actual fuel cell for vehicles, individual unit cells are stacked to obtain required potential, and the stacked structure of unit cells is referred to as a stack.

Meanwhile, an electrode of the fuel cell is formed by mixing a hydrogen ion carrier and a catalyst, and the activity of the electrochemical reaction may be decreased in initial operation after the fuel cell is manufactured since a transfer port is blocked and the carrier may not reach the catalyst, the carrier of hydrogen ions forming a triple phase interface is not easily hydrolyzed in the initial operations, and continuous mobility of the hydrogen ions and electrons is difficult secure. Accordingly, to maximally secure the performance of fuel cells after assembling the membrane-electrode assembly including the electrode and the polymer electrolyte file, and the stack which is an assembly of fuel cells for generating electricity including separators, a process of activation and performance evaluation of the fuel cell stack is performed.

The object of the activation and the performance evaluation is to remove inflow of residual impurities during the process of manufacturing the membrane-electrode assembly and the stack, to activate the sites which do not participate in the reaction, and to secure passages for hydrogen ions by sufficiently hydrolyzing the electrolyte included in the polymer electrolyte membrane and the electrode as well as to secure the passage through which reactants move to the catalyst. Although such an activation of the fuel cell stack has been performed in various methods in the related art, a main method of activation is to detect the voltage of the fuel cell of the stack while operating the stack for a substantial amount of time under a predefined voltage.

For this, equipment for activating the fuel cell stack based on the related art may perform the processes for activating the fuel cell stack and evaluating the performance by supplying the fuel and the oxidizing agent into the fuel cells after manufacturing a stack in which a plurality fuel cells are layered, and by monitoring the voltage of the fuel cells while applying electrical energy generated from the fuel cells to an electric load apparatus. In such processes of activating the fuel cell stack and evaluating the performance, connectors of the voltage measuring equipment are connected to a terminal that protrudes from each fuel cell of the stack, an output cable connected to the electric load apparatus is connected to output terminals at both sides of the stack, and a fluid supplying tube for supplying fluids (e.g., hydrogen, air, and cooling water) is connected to a manifold of the stack.

In the process of connecting the connectors of the voltage measurement equipment to the terminals that protrude from each fuel cell of the stack, the connectors and the terminals of each fuel cell are manually connected. Accordingly, in the related art, since the connectors of the voltage measuring equipment are manually connected to the terminals of the stack, workability may be deteriorated, an excessively substantial period of time is required for the overall process for connecting the connectors and the terminals, and stack damage may occur during the work of connecting the terminal.

In addition, in the process of connecting the output cables connected to the electric load apparatus to the output terminals at both sides of the stack, a worker clamps a bus bar connected to the electric load apparatus and the output cable to the output terminal of both sides of the stack with a bolt. Accordingly, in the related art, the worker may be exposed to a danger of electric shock when manually connecting and detaching the output cable to/from the output terminal on both sides of the stack. In other words, since a current may be generated due to the electro-chemical reaction between remaining hydrogen and air even when supply of the hydrogen and air to the stack is discontinued, an accidental electric shock of a worker may be induced when detaching the output cable from the terminal.

Further, in the process of connecting the fluid supplying tube for supplying fluids to the fuel cells of the stack to the manifold of the stack, the stack is connected to the fluid supplying tube of activating equipment by manually pushing the stack. Accordingly, in the related art, workability may be deteriorated, and air-tightness may not be secured when connecting the fluid supplying tube to the stack manifold since the stack weighing dozens of kilograms is connected to the fluid supplying tube of the activating equipment by manually being pushed.

The above information disclosed in this section is merely for enhancement of understanding of the background of the invention and therefore it may contain information that does not form the prior art that is already known in this country to a person of ordinary skill in the art.

SUMMARY

The exemplary embodiments of the present invention provide an activation apparatus of a fuel cell stack which enables an activating process of the fuel cell stack and performance evaluation to be unmanned and automated, and respond to the process of mass production of automatic assembly of vehicles equipped with the fuel cell. In addition, exemplary embodiments of the present invention provide an activation apparatus of a fuel cell stack which enables the voltage measuring connector, the output cable, and the fluid supply tube to be simultaneously connected in an automated process.

In an activation apparatus of a fuel cell stack according to an exemplary embodiment of the present invention for performing activating and evaluating performance of the fuel cell stack while the fuel cell stack enters a frame, the apparatus may include an output cable connecting unit movably installed back and forth along a side direction of the fuel cell stack in a motor operated manner, and configured to connect an output cable with the fuel cell stack.

In addition, the output cable connecting unit may include a moving body movably installed back and forth along a side direction of the fuel cell stack through an actuator, and a pair of connecting terminal sets elastically installed on the moving body and connected to an output terminal of the fuel cell stack. Further, a pair of attachers that support a side surface of the fuel cell stack may be installed and may be provided with a block shape made of a rubber material.

In the activation apparatus of a fuel cell stack according to an exemplary embodiment of the present invention, the connecting terminal sets may include a cable connecting member fixedly installed to the moving body and connected to electric load equipment through an output cable, a terminal rod that protrudes from inside to outside of the cable connecting member and movably installed back and forth in a side direction of the fuel cell stack. A connecting terminal may be installed to an end of a protrusion, and a spring may be installed inside of the cable connecting member and may exert an elastic force to the terminal rod. In addition, the connecting terminal may be inserted into a terminal receptacle disposed at a side surface of the fuel cell stack, and may form a tapered outer circumference.

Furthermore, a supporting member of a disk shape that supports the output terminal of the fuel cell stack may be installed at the end of the protrusion of the terminal rod. The actuator may include an operating cylinder connected to the moving body which may be movably installed back and forth to the frame using a pair of guide bars.

In particular, the guide bar may be inserted into a pair of supporting blocks disposed on the frame, and may guide a movement of the moving body. The output cable connecting unit may connect a positive (+) cable of electric load equipment to a positive (+) output terminal disposed at a side of the fuel cell stack. Particularly, a negative (−) output cable of electric load equipment may be connected to a negative (−) output terminal disposed at the other side of the fuel cell stack via a fluid supply tube connecting unit to supply fluid to the fuel cell stack. The fluid supply tube connecting unit may include a moving body movably installed to the frame back and forth in the other side direction of the fuel cell stack through an actuator.

The exemplary embodiments of the present invention may enable an activating process of the fuel cell stack and performance evaluation to be unmanned and automated by the connector connecting unit, the output cable connecting unit, and the fluid supply tube connecting unit. In addition, since the voltage measuring connector, the output cable, and the fluid supply tube may be simultaneously connected in an automated process, the system may flexibly respond to the process of mass production of automatic assembly of automobiles equipped with the fuel cell.

In an another exemplary embodiment of the present invention, since the voltage measuring connector, the output cable, and the fluid supply tube may be simultaneously connected in an automated process, workability in the activation process of the fuel cell stack may be improved, damage to the fuel cell stack and accidental electric shock of a worker may be prevented, and air-tightness with the fuel cell stack may be secured when supplying the fluid.

BRIEF DESCRIPTION OF THE DRAWINGS

The drawings are referenced for describing the exemplary embodiments, and the inventive concept of the present invention should not be interpreted as being limited to the accompanying drawings.

DETAILED DESCRIPTION

Figure 1:
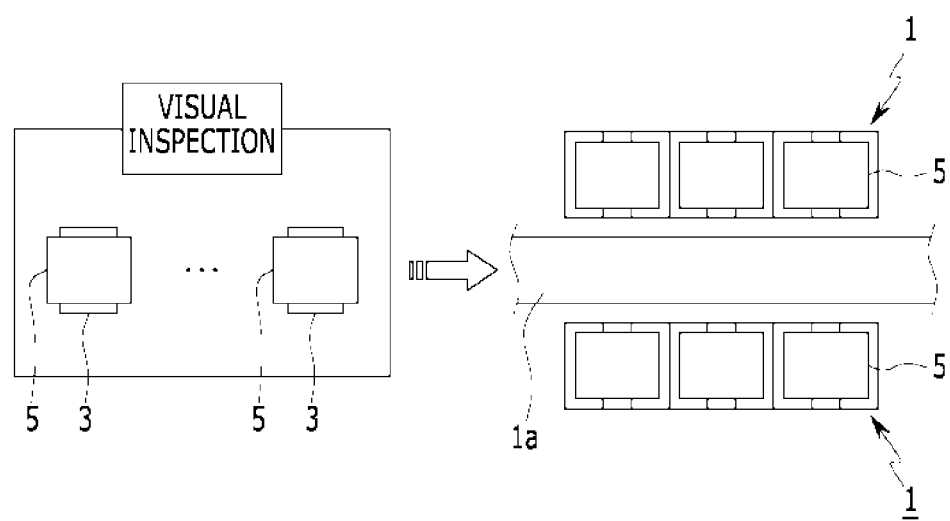
FIG. 1 is a block diagram schematically illustrating a process for activating a fuel cell stack in which an activation apparatus of a fuel cell stack according to an exemplary embodiment of the present invention is applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present invention will be described in detail with reference to the accompanying drawings, in which exemplary embodiments of the invention are shown. However, the present invention may be implemented in various forms, and the scope of the present invention is not limited the exemplary embodiments described herein.

In the drawings, to clearly describe the present invention, parts not related to the description are omitted, and the same reference numerals are designated for identical or similar elements throughout the specification. The size and thickness of each element shown in drawings are arbitrarily shown for convenience of description, but the scope of the present invention is not necessarily limited to the drawings, and the thickness is magnified to clearly express several parts and regions. In the detailed description, elements are distinguished by first, second, etc. to distinguish the elements, but they are not necessarily limited to the order in the description, and the expression of first, second, etc. is deleted in the claims.

FIG. 1 is a block diagram schematically illustrating a process for activating a fuel cell stack in which an activation apparatus of a fuel cell stack according to an exemplary embodiment of the present invention is applied. Referring to FIG. 1, the activation apparatus 1 of the fuel cell stack according to an exemplary embodiment of the present invention may be used to secure performance of the fuel cell stack 5 in which a plurality of fuel cells (hereinafter referred to as a "unit cell") are disposed. In other words, the activation apparatus 1 of the fuel cell stack may activate the unit cell constructing the fuel cell stack 5 and evaluate performance thereof.

For example, in the activation apparatus 1 of the fuel cell stack, the process of activating a membrane-electrode assembly and evaluating the performance may be performed by a method of supplying hydrogen, air, and cooling water to each of the unit cells, and applying a predefined voltage to an electric load from the unit cells. Particularly, the activation apparatus 1 of the fuel cell stack may supply hydrogen, air, and cooling water to the unit cells of the fuel cell stack 5, and apply electrical energy generated by electro-chemical reaction between hydrogen and air in the unit cells to the electric load equipment through an output cable.

The activation apparatus 1 of the fuel cell stack may further be configured to detect failure of the fuel cell stack by measuring voltage of the unit cells applied to the electric load equipment, using cell voltage measuring equipment. The process of activating the fuel cell stack 5 and evaluating the performance in which the activation apparatus 1 of the fuel cell stack is applied may be performed after the fuel cell stack 5 is manufactured.

In describing the process of activating the fuel cell stack 5 and evaluating the performance in which the activation apparatus 1 of the fuel cell stack is applied in detail, first, in an exemplary embodiment of the present invention, a visual inspection of the fuel cell stack 5 transferred by a carrier 3 may be performed. After finishing the visual inspection of the fuel cell stack 5, the fuel cell stack 5 may be transferred to the activation apparatus 1 of the fuel cell stack and the process of activating the fuel cell stack 5 and evaluating the performance may be automatically performed using the activation apparatus 1.

Herein, the activation apparatus 1 of the fuel cell stack according to an exemplary embodiment of the present invention may be disposed in two channels for the process of activating the fuel cell stack 5 and evaluating the performance. In other words, a plurality of activation apparatuses 1 of the fuel cell stack according to an exemplary embodiment of the present invention may be disposed in two channels spaced apart with the transfer path 1a of the fuel cell stack 5 therebetween.

The activation apparatus 1 of the fuel cell stack according to an exemplary embodiment of the present invention as described above may include a structure that enables the activation process of activating the fuel cell stack 5 and the performance evaluation to be unmanned and automated. In other words, the exemplary embodiments of the present invention provide activation apparatus 1 of the fuel cell stack which may automatically and simultaneously connect a voltage measuring connector for the fuel cell stack 5, an output cable, and a fluid supplying tube.

Figure 2A:
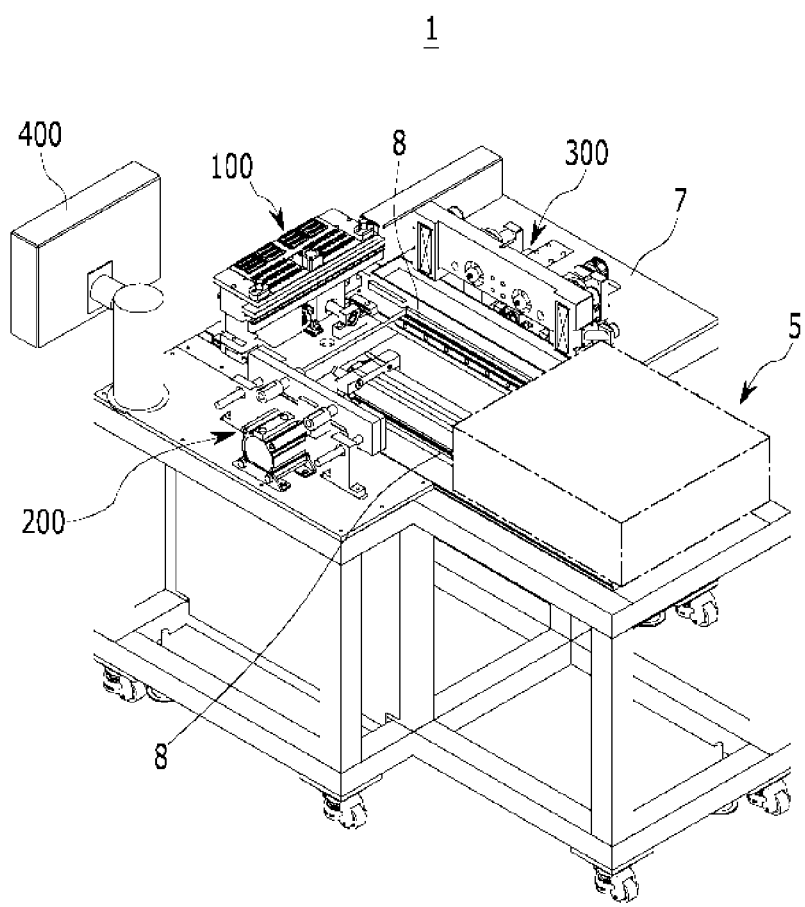
FIG. 2A is a view illustrating an activation apparatus of a fuel cell stack according to an exemplary embodiment of the present invention.
Figure 2B:
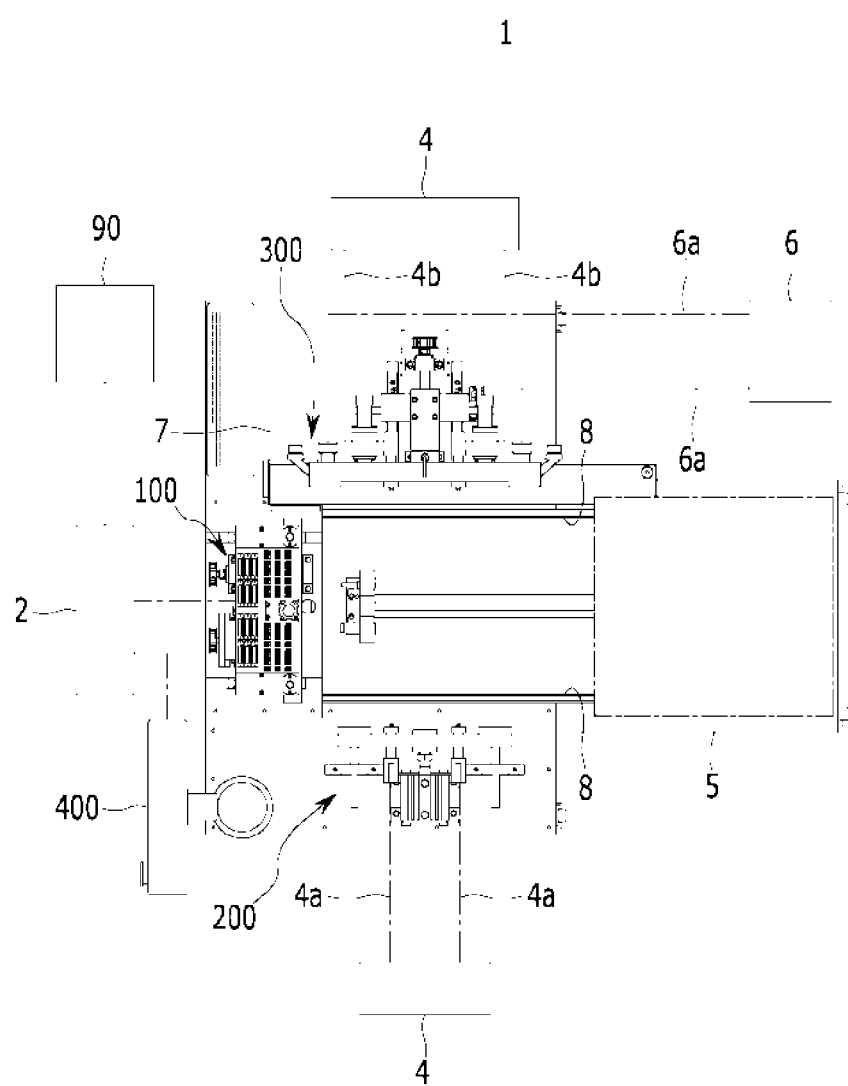
FIG. 2B is a plan schematic diagram illustrating an activation apparatus of fuel cell stack according to an exemplary embodiment of the present invention.

FIG. 2A is a perspective view illustrating an activation apparatus of a fuel cell stack according to an exemplary embodiment of the present invention, and FIG. 2B is a plan schematic diagram illustrating an activation apparatus of a fuel cell stack according to an exemplary embodiment of the present invention. Referring to FIG. 2A and FIG. 2B, the activation apparatus 1 of the fuel cell stack may include a frame 7, a connector connecting unit 100, an output cable connecting unit 200, and a fluid supplying tube connecting unit 300.

In particular, the frame 7 may be configured to support various constituent elements that will be described below, and may include one frame or a frame divided into two or more sectors. The frame 7 may include various annexed elements such as a bracket, a bar, a rod, a plate, a housing, a case, a block, a partition wall, a rib, a rail, a collar, etc. for supporting the constituent elements. However, since the various annexed elements are designed to install each of the constituent elements that will be described below in the frame 7, the annexed elements are commonly called the frame 7 except for exceptional cases. Furthermore, in the frame 7, a transferring apparatus may be installed to place the fuel cell stack 5 in which a plurality of unit cells are layered into an activation task area or to withdraw the fuel cell stack 5 from the activation task area.

The transferring apparatus may include a driving means (not shown in drawings) configured to provide forward and backward driving force to the fuel cell stack 5, and a first guide rail 8 configured to guide the fuel cell stack 5 into the activating task area. Further, a plurality of cell terminals 9 (commonly referred to as "SVM terminal" in the industry) that protrude from a plurality of unit cells may be formed on the fuel cell stack 5. For example, the cell terminals 9 may be continually arranged at a lower part of the fuel cell stack 5 while being spaced apart by a predetermined interval.

Figure 3:
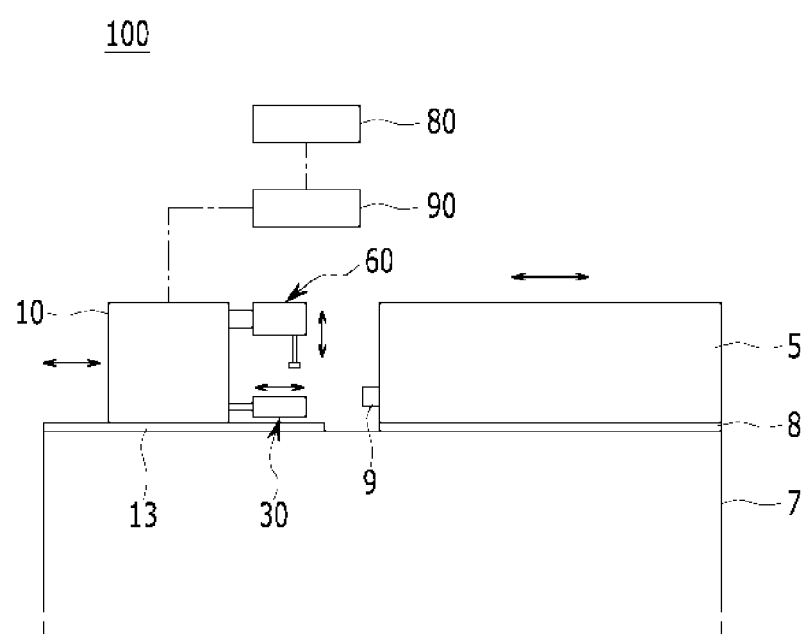
FIG. 3 is a block diagram schematically illustrating a connector connecting unit applied to an activation apparatus of a fuel cell stack according to an exemplary embodiment of the present invention.

FIG. 3 is a block diagram schematically illustrating a connector connecting unit which is applied to an activation apparatus of a fuel cell stack according to an exemplary embodiment of the present invention. Referring to FIG. 2A, FIG. 2B, and FIG. 3, the connector connecting unit 100 may be designed for automatically connecting cell voltage measuring equipment 2 configured to measure average cell voltage of the unit cells constructing the fuel cell stack 5 with the cell terminals 9 of the fuel cell stack 5. Such a connector connecting unit 100 may include a first moving body 10, a terminal guide 30, and a connecting part 60.

In an exemplary embodiment of the present invention, the first moving body 10 may include the terminal guide 30 and the connecting part 60 that will be described below, and may be installed movably back and forth by the fuel cell stack 5 that enters onto the frame 7. The first moving body 10 may be installed to enable reciprocating movements in an entering direction (e.g., horizontal direction) of the fuel cell stack 5 on the frame 7 by the cell terminals 9 of the fuel cell stack 5, based on the fuel cell stack 5 that enters onto the frame 7. In other words, the first moving body 10 may be installed on the frame 7 to allow for reciprocating movements electrically powered along the entering direction of the fuel cell stack 5 that enters onto the frame 7 using the first guide rail 8.

Figure 4:
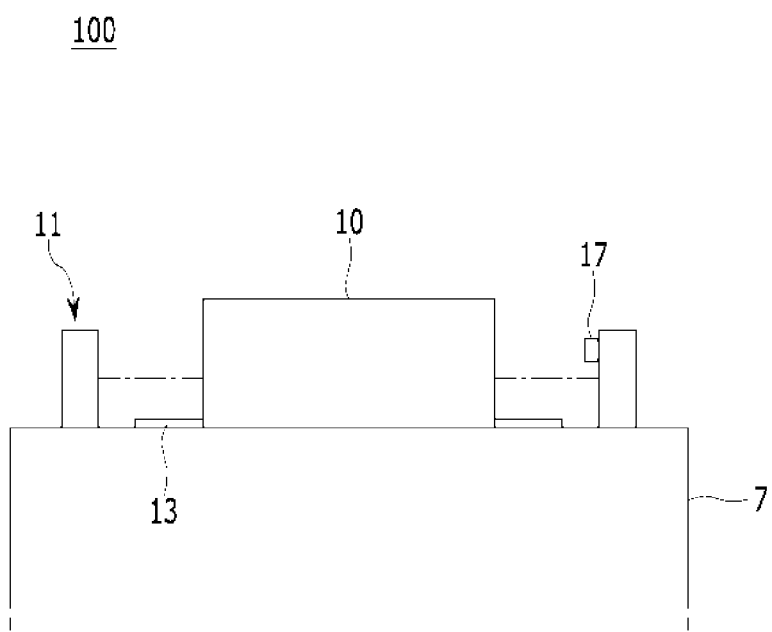
FIG. 4 is a diagram schematically illustrating an operation of a moving body of a connector connecting unit applied to an activation apparatus of a fuel cell stack according to an exemplary embodiment of the present invention.

Such a first moving body 10 may be installed on the frame 7 movably back and forth in the entering direction (e.g., horizontal movement) of the fuel cell stack 5 by a first actuator 11 as shown in FIG. 4, and may be installed movably back and forth in the entering direction of the fuel cell stack 5 along a second guide rail 13 mounted on the frame 7. The first actuator 11 may include a common cylinder apparatus configured to provide forward and backward driving force of air pressure or oil pressure by the first moving body 10, and may also include a common transferring apparatus configured to transform the rotational force of a motor into a linear reciprocating motion through a lead screw and a linear motion (LM) guide. Herein, a proximity sensor 17 configured to limit the transferring location of the first moving body 10 may be installed on the frame 7.

In particular, proximity sensor 17 may be configured to limit a forward location of the first moving body 10 by the fuel cell stack 5. When the first moving body 10 reaches a predetermined position, the proximity sensor 17 may be configured to detect the position and output a sensing signal through a controller 90. The controller 90 may then be configured to stop the movement of the first moving body 10 by applying a control signal to the first actuator 11. Referring to FIG. 3, in an exemplary embodiment of the present invention, the terminal guide 30 may be configured to support the cell terminals 9 of the fuel cell stack 5 that enters onto the frame 7 as mentioned above.

Figure 5:
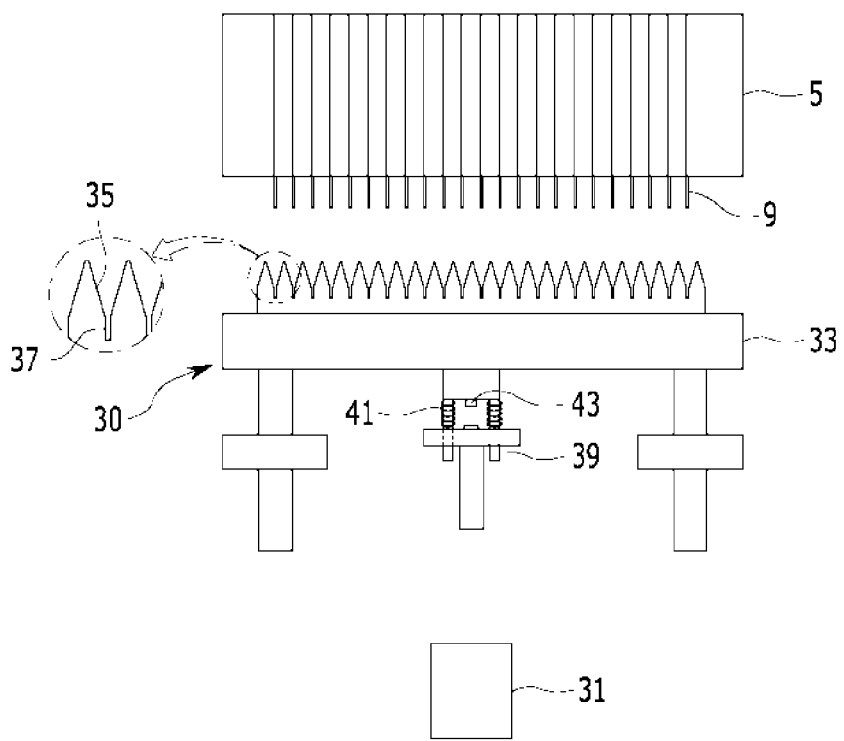
FIG. 5 is a diagram schematically illustrating a terminal guide of a connector connecting unit applied to an activation apparatus of a fuel cell stack according to an exemplary embodiment of the present invention.

FIG. 5 is a diagram schematically illustrating a terminal guide of a connector connecting unit applied to an activation apparatus of a fuel cell stack according to an exemplary embodiment of the present invention. Referring to FIG. 3 and FIG. 5, in an exemplary embodiment of the present invention, the terminal guide 30 may be formed to move the first moving body 10 back and forth by the cell terminals 9 of the fuel cell stack 5. The terminal guide 30 may include a guide block 33 installed movably back and forth in the horizontal direction (e.g., entering direction of the fuel cell stack) in the first moving body 10 through a second actuator 31.

In the above description, the second actuator 31 may include a common cylinder apparatus configured to provide forward and backward driving force of air pressure or oil pressure by the guide block 33, and may also include a common transferring apparatus configured to switch the rotational force of a motor to linear back and forth motions through a lead screw and an LM guide.

On the guide block 33, "V"-shaped supporting grooves 35 may be formed to support the cell terminals 9 of the fuel cell stack 5. An inserting groove 37 into which the cell terminal 9 is inserted may be formed in the supporting grooves 35. In other words, as the guide block 33 moves toward the cell terminals 9 of the fuel cell stack 5 by the second actuator 31, the cell terminals 9 may be guided to the supporting grooves 35 of the guide block 33 and inserted into the inserting groove 37. Herein, the guide block 33 may be movably installed to a connecting end of the second actuator 31 using a first guide bar 39, and a shock absorbing spring 41 configured to absorb supporting pressure of the guide block 33 against the cell terminals 9 between the guide block 33 and the connection end of the second actuator 31 may be installed on the first guide bar 39.

A first load cell 43 configured to detect a contact with the connecting end of the second actuator 31 may be installed on the guide block 33. The first load cell 43 may be configured to sense contact pressure between the connecting end of the second actuator 31 and the guide block 33, and output a sensing signal through the controller 90. In other words, when the guide block 33 moves toward the cell terminals 9 of the fuel cell stack 5 by the second actuator 31, the first load cell 43 may be configured to absorb the supporting pressure of the guide block 33 against the cell terminals 9, and when the connecting end of the second actuator 31 contacts the guide block 33, the first load cell 43 may be configured to sense the contact and output the sensing signal through the controller 90. Then, the controller 90 may be configured to apply control signals to the second actuator 31 and stop operation of the second actuator 31. Referring to FIG. 3, in an exemplary embodiment of the present invention, the connecting part 60 may be connected to the cell terminals 9 of the fuel cell stack 5, and is commonly referred to as "CVM connector" in the industry.

Figure 6:
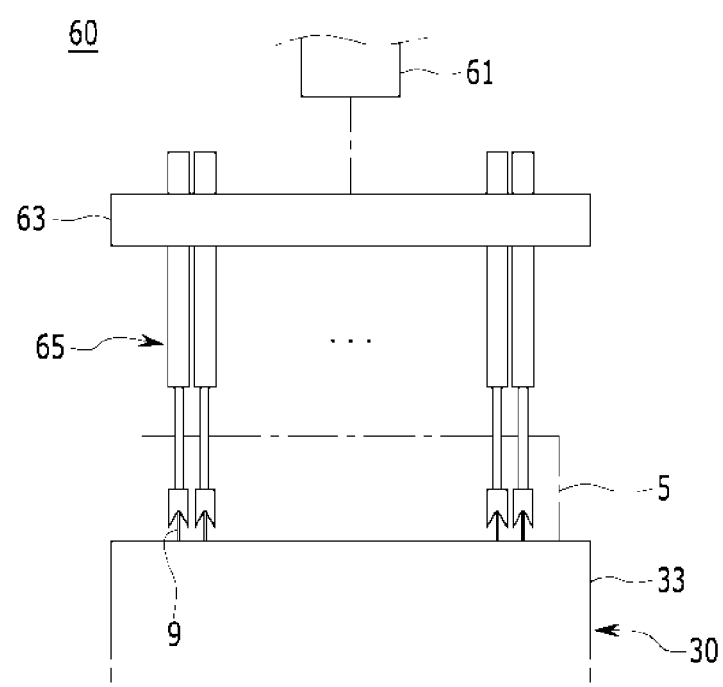
FIG. 6 is a diagram schematically illustrating a connecting part of a connector connecting unit applied to an activation apparatus of a fuel cell stack according to an exemplary embodiment of the present invention.

FIG. 6 is a diagram schematically illustrating a connecting part of a connector connecting unit applied to an activation apparatus of a fuel cell stack according to an exemplary embodiment of the present invention. Referring to FIG. 3 and FIG. 6, in an exemplary embodiment of the present invention, the connecting part 60 may include a probe block 63 installed in the first moving body 10 to reciprocate up and down movement (e.g., vertical movement) by a third actuator 61. In other words, the probe block 63 may be transferred in a downward direction by the third actuator 61 while the cell terminals 9 of the fuel cell stack 5 may be supported by the guide block 33.

The above-described third actuator 61 may be installed in the first moving body 10, and may include a common cylinder apparatus operated forward and backward by air pressure or oil pressure and may cause the probe block 63 to reciprocate up and down. In the above description, a plurality of connector probes 65 that contact the cell terminals 9 arranged to be supported by the guide block 33 may be installed on the probe block 63. The connector probes 65 may be successively arranged while spaced apart by a predetermined interval on the probe block 63 corresponding to the cell terminals 9 of the fuel cell stack 5. Such a connector probe 65 may be connected to the cell terminals 9 of the fuel cell stack 5 in a contact manner.

Figure 7:
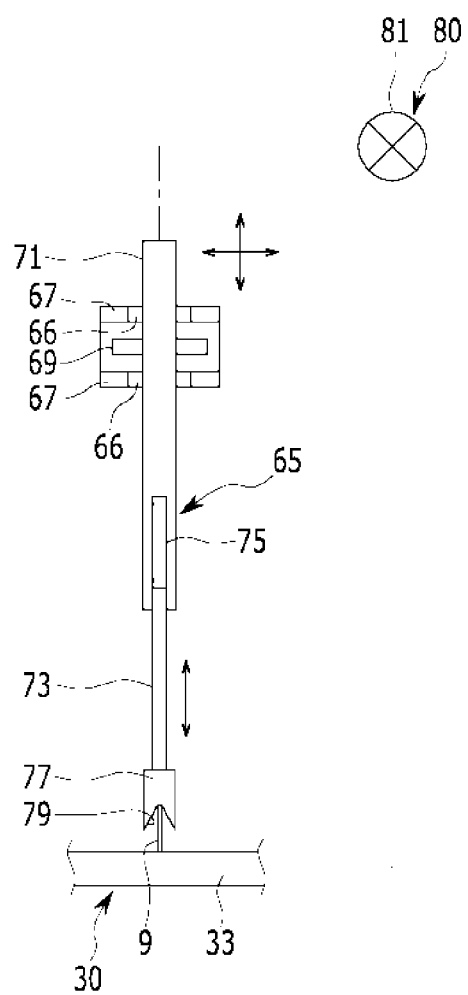
FIG. 7 is a diagram schematically illustrating a connector probe of a connecting part applied to an activation apparatus of a fuel cell stack according to an exemplary embodiment of the present invention.

FIG. 7 is a diagram schematically illustrating a connector probe of a connecting part applied to an activation apparatus of a fuel cell stack according to an exemplary embodiment of the present invention. Referring to FIG. 6 and FIG. 7 together with FIG. 3, in an exemplary embodiment of the present invention, the connector probe 65 may be installed on the probe block 63 movably in up/down and left/right directions (e.g., in horizontal and vertical directions).

Accordingly, a pair of fixing plates 67 that include a mounting aperture 66 having a greater inner diameter than an outer diameter of the connector probe 65 and supporting the connector probe 65 through the mounting aperture 66 may be installed on the probe block 63. A ring member 69 may be fixed at the connector probe 65, and the ring member 69 may be disposed between a pair of fixing plates 67 at a predetermined distance from the fixing plates 67. In other words, the connector probe 65 may be supported by the fixing aperture 66 of the fixing plate 67 with a greater inner diameter than the outer diameter thereof, and may be movably installed at the probe block 63 in up/down and left/right directions (referring to the drawing) as the ring member 69 is fixed between the pair of fixing plates 67.

Therefore, the cell terminals 9 may be more accurately connected with the connector probes 65 by permitting movement in vertical and horizontal directions of the connector probes 65 when position deviation occurs such as when the connector probes are disposed within a predetermined tolerance on the cell terminals 9 or the cell terminals 9 are non-uniformly arranged.

Meanwhile, in an exemplary embodiment of the present invention, the connector probe 65 may include a cylinder member 71, a probe pin 73, a return spring 75, and a connector head 77. The cylinder member 71 may be movably installed on the probe block 63 in vertical and horizontal directions as described above, and the probe pin 73 may be movably installed in the cylinder member 71 in vertical directions while being protruded outside of the cylinder member 71. The return spring 75 may provide adhesive force for the cell terminals 9 installed in the cylinder member 71 and may exert elastic force to the probe pin 73. The connector head 77 may substantially contact (e.g., abut) the cell terminals 9 of the fuel cell stack 5, and may be installed at an end part (e.g., lower end part based on the drawing) of the probe pin 73.

Herein, a "V" shaped groove 79 that supports the cell terminals 9 of the fuel cell stack 5 may be formed in the connector head 77. In other words, since the "V" shaped head groove 79 may be formed in the connector head 77, the connector probes 65 may move vertically and horizontally by the probe block 63.

Furthermore, referring to FIG. 3 and FIG. 7, the connector connecting unit 100 according to an exemplary embodiment of the present invention may further include a display part 80 configured to display the electrical connection between the cell terminals 9 of the fuel cell stack 5 and the connector probes 65. In an exemplary embodiment of the present invention, the display part 80 may be electrically connected to the connector probes 65 and the guide block 33 of the terminal guide 30, and may include an light emitting diode (LED) bulb 81 configured to emit light (LED light) by electric signals.

Moreover, the connector probes 65 and the guide block 33 may be made of a conductive material, and when the connector probes 65 contact (e.g., abut) the cell terminals 9, electric power may be applied to the LED bulb 81, and the LED bulb 81 may be configured to display the connection state between each of the connector probes 65 and the cell terminals 9 with light. When the connector probes 65 and cell terminals 9 do not properly contact or the unit battery is poor (e.g., insufficient contact), the LED bulb 81 may be configured to not emit light since electric power is not applied thereto, and thus, the poor state of the corresponding cell may be displayed to the exterior.

In an exemplary embodiment of the present invention, as shown in FIG. 2A, FIG. 2B, and FIG. 3, the controller 90 may be included to execute the overall operation of the activation apparatus 1. The sensing signal of the proximity sensor 17 described above may be applied to the controller 90, and the controller 90 may be configured to operate the first actuator 11 to limit the forward position of the first moving body 10 with respect to the fuel cell stack 5.

In addition, as described above, when the connection terminal of the second actuator 31 contacts the guide block 33, the sensing signal of the first load cell 43 may be transmitted to the controller 90, and the controller 90 may be configured to operate the second actuator 31. The controller 90 may then be configured to operate the third actuator 61 and move the probe block 63 in a vertical direction, and may be configured to apply power to the LED bulb 81 of the display 80 when the connector probes 65 contacts the cell terminals 9. Referring to FIG. 2A and FIG. 2B, in an exemplary embodiment of the present invention, the output cable connecting unit 200 may be configured to automatically connect a positive (+) output cable 4a of the electric load equipment 4 to a side surface of the fuel cell stack 5 that enters onto the frame 7.

Figure 8A:
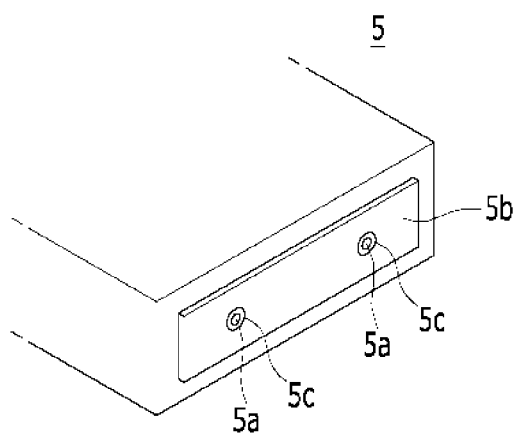
FIGS. 8A-8B are diagrams schematically illustrating a fuel cell stack applied to an activation apparatus of a fuel cell stack according to an exemplary embodiment of the present invention.

As shown in FIG. 8A, the output cable connecting unit 200 may be configured to automatically connect the positive (+) output cable 4a of the electric load equipment 4 (refer to FIG. 2B) to a terminal 5a disposed at a side surface of the fuel cell stack 5. Such a positive (+) output terminal 5a may be disposed at an end plate 5b that each of them is equipped with at a side of the fuel cell stack 5, and a terminal receptacle 5c may be formed at the positive (+) output terminal 5a.

Figure 9A:
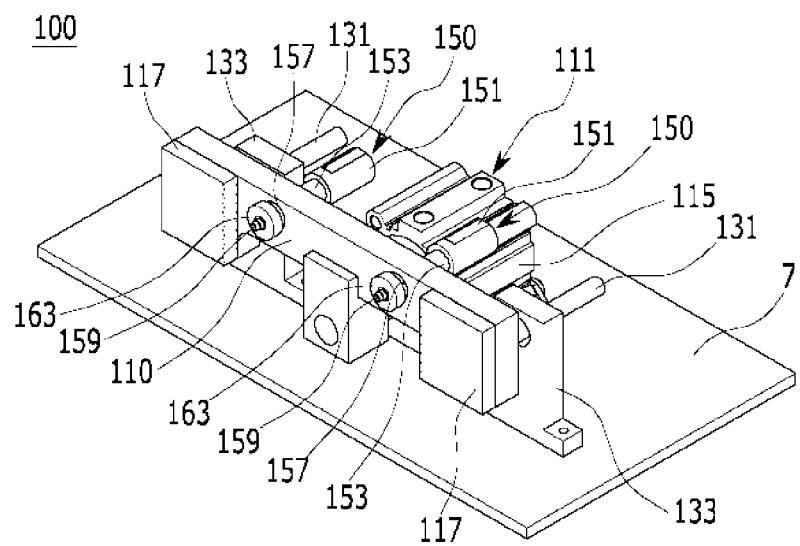
FIGS. 9A-9B are diagrams illustrating an output cable connecting unit applied to an activation apparatus of a fuel cell stack according to an exemplary embodiment of the present invention.
Figure 9B:
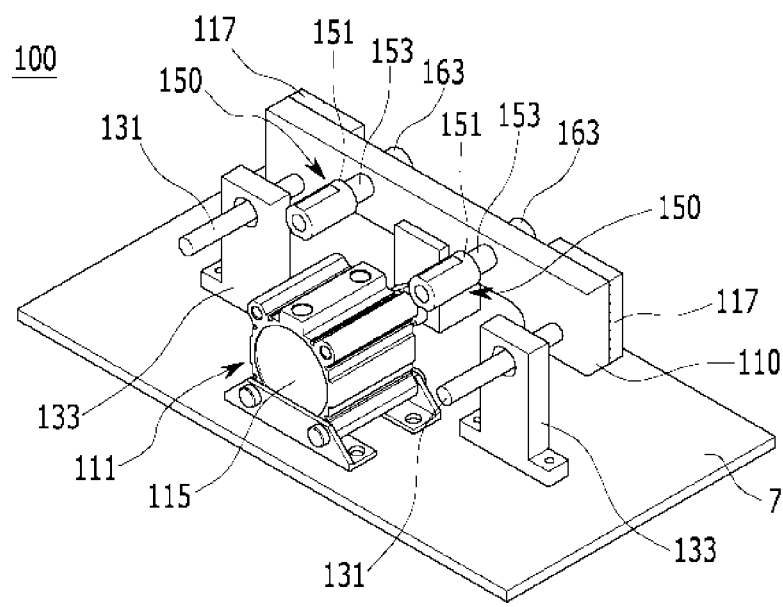

FIGS. 9A-9B are views illustrating an output cable connecting unit applied to an activation apparatus of a fuel cell stack according to an exemplary embodiment of the present invention. Referring to FIG. 2A, FIG. 2B, and FIGS. 9A-9B, in an exemplary embodiment of the present invention, the output cable connecting unit 200 may include a second moving body 110 and a first connecting terminal set 150.

The second moving body 110 may include the first connecting terminal set 150 that will be described below, and may be installed movably back and forth with respect to a side of the fuel cell stack 5 that enters onto the frame 7. The second moving body 110 may be installed movably back and forth in a side direction of the fuel cell stack 5 on the frame 7 with respect to the positive (+) output terminal 5a (refer to FIG. 8A) of the end plate 5b (refer to FIG. 8A) disposed at a side surface of the fuel cell stack 5, based on the fuel cell stack 5 that enters onto the frame 7.

In other words, the second moving body 110 may be installed movably back and forth in a motor operated manner along a side direction of the fuel cell stack 5 that enters onto the frame 7 using the first guide rail 8. Further, the second moving body 110 may be installed movably back and forth along a side direction of the fuel cell stack 5 on the frame 7 by a fourth actuator 111. The fourth actuator 111 may include an operating cylinder 115 configured to move the second moving body 110 back and forth along a side direction of the fuel cell stack 5 by providing driving force in forward and backward directions (e.g., horizontal directions) with respect to the second moving body 110. For example, the operating cylinder 115 may include an air pressure cylinder.

Further, a pair of attachers 117 that support a side surface of the fuel cell stack 5 may be installed on the second moving body 110. The attacher 117 may be configured to buffer the adhering force of the second moving body 110 when the front surface of the second moving body 110 contacts a side surface of the fuel cell stack 5 by the forward driving of the fourth actuator 111. Additionally, the attacher 117 may include a block shape made of a rubber material, and may be fixedly installed at both front sides of the second moving body 110 that correspond to a side surface of the fuel cell stack 5.

Figure 10:
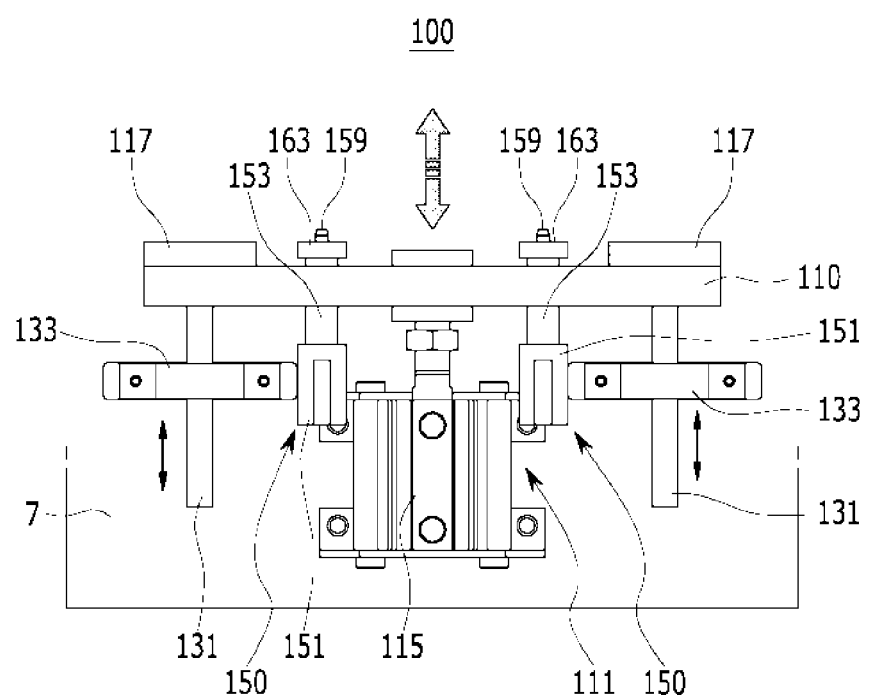
FIG. 10 is a diagram schematically illustrating an operation of a moving body of an output cable connecting unit applied to an activation apparatus of a fuel cell stack according to an exemplary embodiment of the present invention.

Herein, since the second moving body 110 may be connected to the operating cylinder 115 of the fourth actuator 111 as shown in FIG. 9 and FIG. 10, and may be configured to move back and forth along a side surface of the fuel cell stack 5, the second moving body 110 may be movably supported on the frame 7 back and forth using a second guide bar 131. A pair of the second guide bars 131 may be connected to the rear surface of the second moving body 110, and may be inserted into a pair of first supporting blocks 133 fixed on the frame 7, to thus guide the back and forth movement of the second moving body 110.

Figure 11:
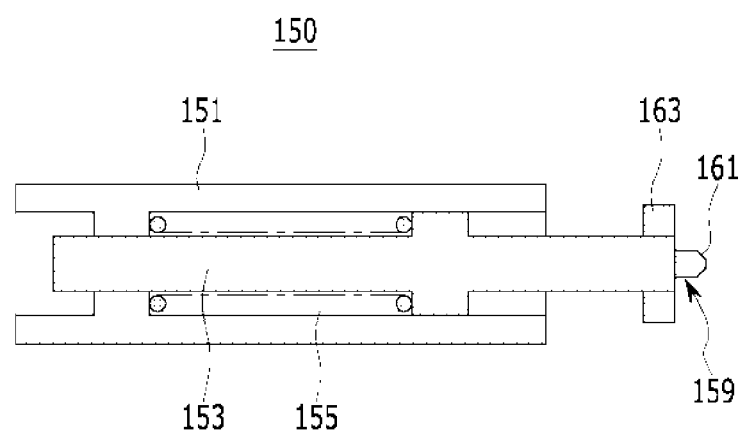
FIG. 11 is a diagram illustrating a first connecting terminal set of an output cable connecting unit applied to an activation apparatus of a fuel cell stack according to an exemplary embodiment of the present invention.

FIGS. 11A-11B are diagrams illustrating a first connecting terminal set of an output cable connecting unit applied to an activation apparatus of a fuel cell stack according to an exemplary embodiment of the present invention. Referring to FIGS. 9A-9B and FIGS. 11A-11B, in an exemplary embodiment of the present invention, the first connecting terminal set 150 may be electrically connected to the positive (+) terminal 5a of the fuel cell stack 5 by the second moving body 110 that moves along a side direction of the fuel cell stack 5.

The first connecting terminal set 150 may be elastically installed on the second moving body 110, and may be electrically connected to the positive (+) output terminal 5a of the end plate 5b disposed at a side surface of the fuel cell stack 5. Additionally, the first connecting terminal set 150 may include a first cable connecting member 151 fixedly installed on the second moving body 110, a first terminal rod 153 installed on the first cable connecting member 151, and a first spring 155 installed inside of the first cable connecting member 151.

The first cable connecting member 151 may have a cylindrical shape, may be installed at the rear surface of the second moving body 110, and may be connected to the electric load equipment 4 (refer to FIG. 2B) via the positive (+) output cable 4a. The first terminal rod 153 may protrude from inside of the first cable connecting member 151 to the front side of the second moving body 110, and may be movably installed along a side direction of the fuel cell stack 5. In other words, the first terminal rod 153 may be installed from the inside of the first cable connecting member 151 to the front side of the second moving body 110 through an aperture 157 of the second moving body 110.

A first connecting terminal 159 electrically connected to the positive (+) output terminal 5a of the fuel cell stack 5 may be installed at the protruded end of the first terminal rod 153. The first connecting terminal 159 may be inserted into the terminal receptacle 5c of the positive (+) output terminal 5a. The outer circumference surface of the first connecting terminal 159 may form a tapered surface 161 to insert the first connecting terminal 159 into the terminal receptacle 5c of the positive (+) output terminal 5a.

In the above description, a first supporting member 163 having a disk shape that supports the positive (+) output terminal 5a of the fuel cell stack 5 may be installed at the protruded end of the first terminal rod 153. In other words, the first supporting member 163 may be configured to support the positive (+) output terminal 5a of the end plate 5b when the first terminal rod 153 is inserted into the terminal receptacle 5c of the positive (+) output terminal 5a.

The first spring 155 may be installed on the first terminal rod 153 inside of the first cable connecting member 151. The first spring 155 may be configured to support the positive (+) output terminal 5a of the end plate 5b using the first supporting member 163, and exert elastic force to the first terminal rod 153 when the first terminal rod 153 is inserted into the terminal receptacle 5c of the positive (+) output terminal 5a. In other words, the first terminal rod 153 may be configured to move in the rear direction of the second moving body 110 while overcoming the elastic force of the first spring 155, and apply the elastic force of the first spring 155 to the positive (+) output terminal 5a via the first connecting terminal 159.

Figure 8B:
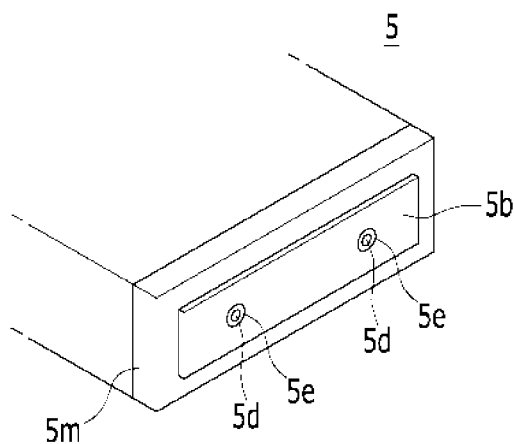

Referring to FIG. 2A and FIG. 2B, in an exemplary embodiment of the present invention, a fluid supply tube connecting unit 300 may be configured to automatically connect a negative (−) output cable 4b of the electric load equipment 4 to the other side surface of the fuel cell stack 5 that enters onto the frame 7, and to automatically connect a fluid supplying tube 6a of fluid supplying equipment 6 to the fuel cell stack 5. Particularly, the fluid supply tube connecting unit 300 may be configured to automatically connect the negative (−) output cable 4b of the electric load equipment 4 (refer to FIG. 2B) to a negative (−) output terminal 5d disposed at the other side surface of the fuel cell stack 5, as shown in FIG. 8B.

Further, the negative (−) output terminal 5d may be disposed at each end plate 5b equipped at the other side (e.g., a second side) of the fuel cell stack 5, and a terminal receptacle 5e may be formed on the negative (−) output terminal 5d. A manifold 5m configured to inject and exhaust hydrogen, air, and cooling water supplied through the fluid supply tube 6a of the fluid supply equipment 6, and connected to the fluid supply tube connecting unit 300, may be provided to the fuel cell stack 5.

Figure 12A:
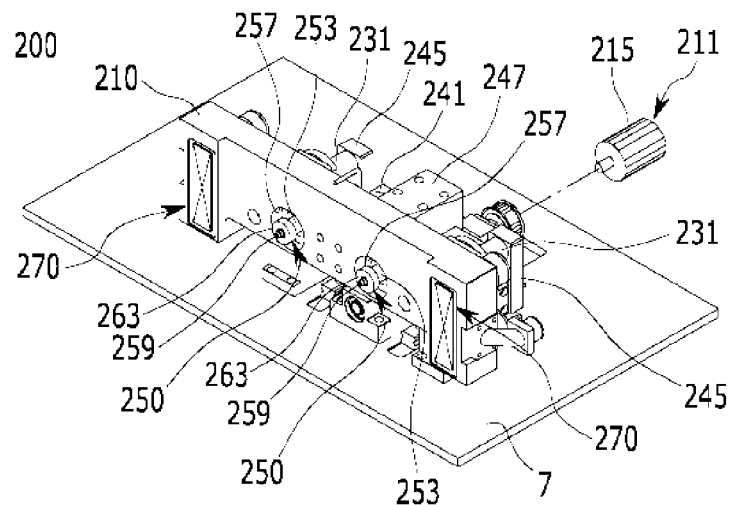
FIGS. 12A-12B are diagrams illustrating a fluid supply tube connecting unit applied to an activation apparatus of a fuel cell stack according to an exemplary embodiment of the present invention.
Figure 12B:
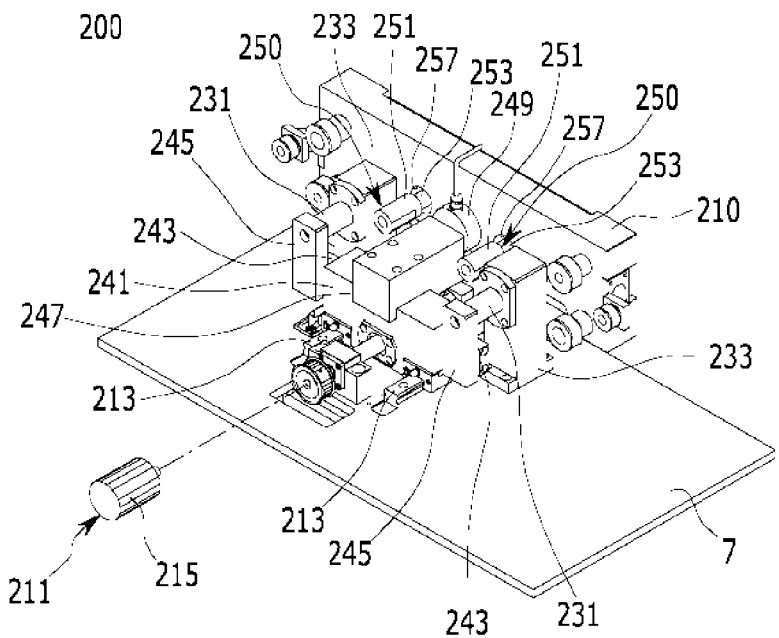

FIG. 12 is a perspective view illustrating a fluid supply tube connecting unit applied to an activation apparatus of a fuel cell stack according to an exemplary embodiment of the present invention. Referring to FIG. 2A, FIG. 2B, and FIG. 12, in an exemplary embodiment of the present invention, the fluid supply tube connecting unit 300 may include a third moving body 210 and a second connecting terminal set 250.

The third moving body 210 may include the second connecting terminal set 250 that will be described below, and may be installed movably back and forth with respect to the other side of the fuel cell stack 5 that enters onto the frame 7. The third moving body 210 may be installed movably back and forth in the other side direction of the fuel cell stack 5 on the frame 7 with respect to the negative (−) output terminal 5d (refer to FIG. 8B) of the end plate 5b (refer to FIG. 8B) disposed at the other side surface of the fuel cell stack 5, based on the fuel cell stack 5 that enters onto the frame 7. In other words, the third moving body 210 may be installed movably back and forth in a motor operated manner along the other side direction of the fuel cell stack 5 that enters onto the frame 7 through the first guide rail 8.

In addition, a third moving body 210 may be installed movably back and forth along the other side direction of the fuel cell stack 5 on the frame 7 by a fifth actuator 211. The third moving body 210 frame 7 may be installed movably back and forth along the other side direction of the fuel cell stack 5 using a third guide rail 213 attached onto the frame 7. The fifth actuator 211 may include a transferring apparatus configured to transform rotational motion of a motor 215 to linear reciprocal motion through the lead screw and LM guide.

Figure 13:
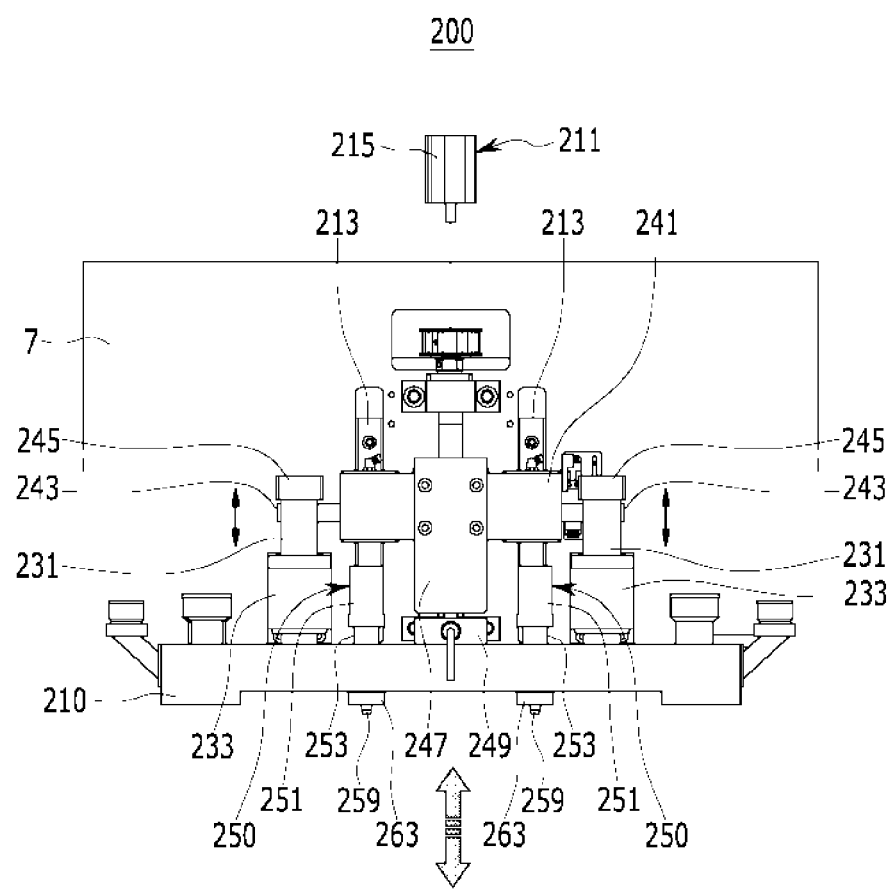
FIG. 13 is a diagram illustrating an operation of a moving body of a fluid supply tube connecting unit applied to an activation apparatus of a fuel cell stack according to an exemplary embodiment of the present invention.

Particularly, as shown in FIG. 12 and FIG. 13, the third moving body 210 may be movably installed to the frame 7 back and forth in the other side direction of the fuel cell stack 5 using a pair of third guide bars 231. The third guide bar 231 may be connected to a rear surface of the third moving body 210, inserted into a pair of second supporting blocks 233 disposed on the frame 7, and guide the movement of the third moving body 210.

A moving block 241 configured to move back and forth in the other direction of the fuel cell stack 5 by the fifth actuator 211 may be installed on the frame 7 that corresponds to the rear surface of the third moving body 210. The moving block 241 may be coupled to the third guide rail 213 mentioned above, to allow sliding motion in the other direction of the fuel cell stack 5. In particular, a stopper 243 may be integrally formed at both sides of the moving block 241. In addition, a stopping block 245 engaged with the stopper 243 and corresponding to the stopper 243 may be installed at an end of the third guide bar 231. Accordingly, when the moving block 241 reverses (e.g. reverses direction) from the other side surface of the fuel cell stack 5 by the fifth actuator 211, the stopper 243 may be configured to reverse the third moving body 210 while being engaged with the stopping block 245.

Meanwhile, a fixing block 247 that faces a rear surface of the third moving body 210 may be fixedly installed at the moving block 241. The fixing block 247 may be configured to support the rear surface of the third moving body 210 when the moving block 241 moves forward in the other side direction of the fuel cell stack 5 by the fifth actuator 211. In other words, the fixing block 247 may be configured to move forward while pushing the third moving body 210 when the moving block 241 moves forward in the other side direction of the fuel cell stack 5 by the fifth actuator 211.

Corresponding to the fixing block 247, a second load cell 249 that contacts the fixing block 247 may be installed at the rear surface of the third moving body 210. The second load cell 249 may be used to sense the contact pressure of the fixing block 247 for the third moving body 210. In particular, the second load cell 249 may be configured to sense the contact pressure with the fixing block 247, and output the sensing signal to the controller 90 (refer to FIG. 2B). The second load cell 249 may further be configured to sense the contact pressure of the fixing block 247 for the third moving body 210, when the front surface of the third moving body 210 contacts the other side surface of the fuel cell stack 5 through the fixing block 247 while moving the moving block 241 forward by the fifth actuator 211.

Then, when the pressure applied to the other side surface of the fuel cell stack 5 exceeds a predetermined reference pressure by comparing the pressure applied to the other side surface of the fuel cell stack 5 with the predetermined reference pressure, the controller 90 may be configured to terminate the operation of the fifth actuator 211 by applying a control signal to the fifth actuator 211.

Figure 14:
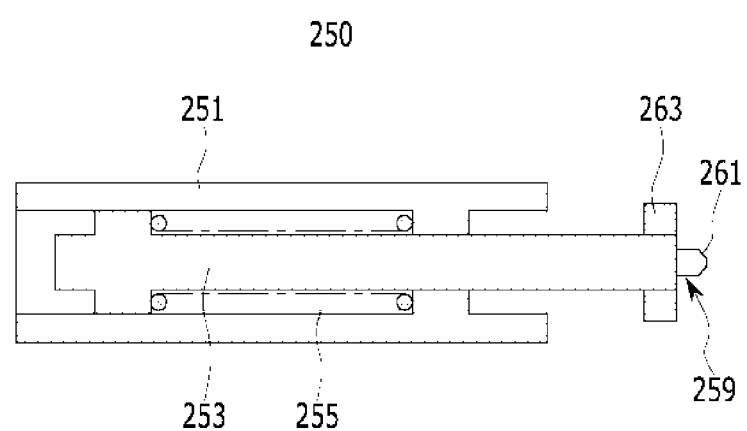
FIG. 14 is a diagram illustrating a second connecting terminal set of a fluid supply tube connecting unit applied to an activation apparatus of a fuel cell stack according to an exemplary embodiment of the present invention.

FIG. 14 is a diagram illustrating a second connecting terminal set of a fluid supply tube connecting unit applied to an activation apparatus of a fuel cell stack according to an exemplary embodiment of the present invention. Referring to FIG. 12 and FIG. 14, in an exemplary embodiment of the present invention, the second connecting terminal set 250 may be configured to connect the negative (−) output cable 4b of the electric load equipment 4 (refer to FIG. 2B) to the negative (−) output terminal 5d of the fuel cell stack 5 by the third moving body 210 configured to move in the other side direction of the fuel cell stack 5, and may be electrically connected to the negative (−) terminal 5d of the fuel cell stack 5.

The second connecting terminal set 250 may be elastically installed to the third moving body 210, and may be electrically connected to the negative (−) output terminal 5d of the end plate 5b disposed at the other side surface of the fuel cell stack 5. The second connecting terminal set 250 may include a second cable connecting member 251 fixedly installed to the third moving body 210, a second terminal rod 253 installed to the second cable connecting member 251, and a second spring 255 installed inside of the second cable connecting member 251.

Further, the second cable connecting terminal 251 may have a cylindrical shape, may be installed at a rear surface of the third moving body 210, and may be connected to the electric load equipment 4 (refer to FIG. 2B) via the negative (−) output cable 4b. The second terminal rod 253 may protrude from inside of the second cable connecting member 251 to the front surface of the third moving body 210, and may be movably installed in the other direction of the fuel cell stack 5. In other words, the second terminal rod 253 may be installed while protruding from the inside of the second cable connecting member 251 to the front surface of the third moving body 210 through an aperture 257 of the third moving body 210.

A second connecting terminal 259 electrically connected to the negative (−) output terminal 5d of the fuel cell stack 5 may be installed at the protruding end of the second terminal rod 253. The second connecting terminal 259 may be inserted into a terminal receptacle 5e of the negative (−) output terminal 5d. A tapered surface 261 may be formed on an outer circumference surface of the second connecting terminal 259 to insert the second connecting terminal 259 into the terminal receptacle 5e of the negative (−) output terminal 5d.

In the above description, a second supporting member 263 having a disk shape that supports the negative (−) output terminal 5d of the fuel cell stack 5 may be installed at the protruding end of the second terminal rod 253. In other words, the second supporting member 263 may be configured to support the negative (−) output terminal 5d of the end plate 5b, when the second terminal rod 253 is inserted into the terminal receptacle 5e of the negative (−) output terminal 5d.

The second spring 255 may be installed on the second terminal rod 253 inside of the second cable connecting member 251. Additionally, the second spring 255 may be configured to support the negative (−) output terminal 5d of the end plate 5b using the second supporting member 263, and exert an elastic force when the second terminal rod 253 is inserted into the terminal receptacle 5e of the negative (−) output terminal 5d. In other words, the second terminal rod 253 may be configured to move in the rear direction of the third moving body 210 while overcoming the elastic force of the second spring 255, and may be configured to apply the elastic force of the second spring 255 to the negative (−) output terminal 5d via the second connecting terminal 259.

Referring to FIG. 2A, FIG. 2B, and FIG. 12, in an exemplary embodiment of the present invention, the fluid supply tube connecting unit 300 may be provided to the third moving body 210, and may include a plurality of tube connecting parts 270 connected to the fluid supply tube 6a of the fluid supply equipment 6. Each tube connecting part 270 may be connected to the manifold 5m (refer to FIG. 8 B) of the fuel cell stack 5, may be configured to supply hydrogen, air, and cooling water to the manifold 5m of the fuel cell stack 5, and may be formed of fluid supply/exhaust apertures through which hydrogen, air, and cooling water may be exhausted from the fuel cell stack 5.

Figure 15:
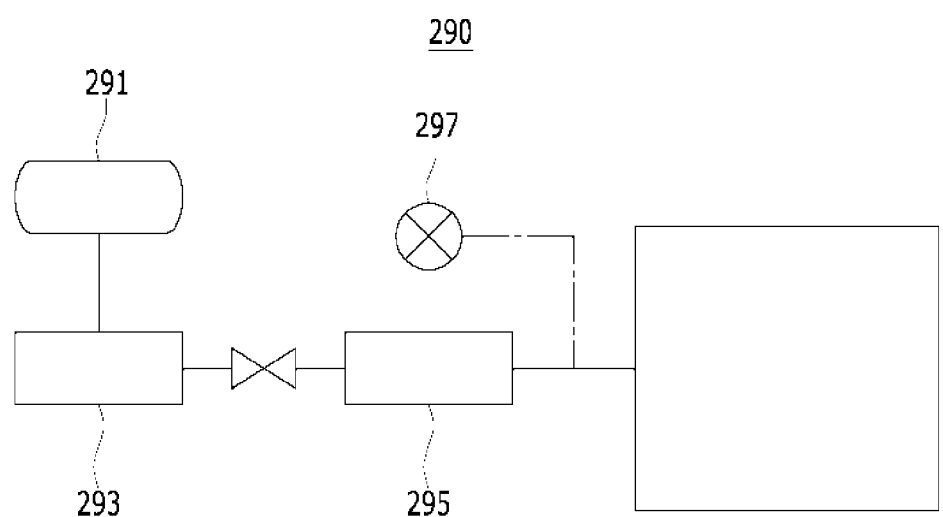
FIG. 15 is a diagram schematically illustrating an airtightness testing part of a fluid supply tube connecting unit applied to an activation apparatus of a fuel cell stack according to an exemplary embodiment of the present invention.

Moreover, the fluid supply tube connecting unit 300 according to an exemplary embodiment of the present invention, as shown in FIG. 15, may further include an air-tightness testing part 290 used to test the air-tightness of the fuel cell stack 5. The air-tightness testing part 290 may be configured to connect the fluid supply tube 6a of the fluid supply equipment 6 to the manifold 5m of the fuel cell stack 5 via the tube connecting part 270 to test the air-tightness of the fuel cell stack 5 by injecting air into the fuel cell stack 5.

Such an air-tightness testing part 290 my include an air supply source 291 configured to supply air to the tube connecting part 270 of the third moving body 210, an air pressure regulator 293 configured to regulate the air pressure supplied to the tube connecting part 270, a flow meter 295 configured to measure the supplied air, and a pressure sensor 297 configured to sense the air pressure exerted to the inside of the fuel cell stack. Accordingly, in an exemplary embodiment of the present invention, the fluid supply apertures of the tube connecting part 270 may be opened, and the air supplied from the air supply source 291 may be injected into the fluid supply apertures of the tube connecting part 270 while the fluid exhaust aperture may remain closed. The air pressure supplied from the air supply source 291 may be regulated with a predetermined pressure using the air pressure regulator 293, and the flow rate of the supplied air may be measured by the flow meter 295 and regulated with a predetermined flow rate based on the measured value.

The pressure sensor 297 may be configured to sense the air pressure exerted inside of the fuel cell stack 5, and output the sensing signal to the controller 90 (refer to FIG. 2B). Accordingly, the controller 90 may be configured to determine the failure of air-tightness of the fuel cell stack 5 (e.g., an air leak) by comparing the predetermined air pressure inside the fuel cell stack 5 with actual air pressure inside the fuel cell stack 5 based on the sensing signal.

Moreover, as shown in FIG. 2B, the activation apparatus 1 of the fuel cell stack according to an exemplary embodiment of the present invention may further include a display 400 configured to output (e.g., display) failure of the fuel cell stack 5 based on control signals from the controller 90 according to an average cell voltage of the fuel cell stack measured using the cell voltage measuring equipment 2. For example, the controller 90 may be configured to display the failure of the fuel cell stack 5 through the display 400 by comparing and determining the average cell voltage of the fuel cell stack 5 measured using the cell voltage measuring equipment 2 with the reference voltage.

Hereinafter, the operation of the activation apparatus of the fuel cell stack included as in the above description according to an exemplary embodiment of the present invention will be described with reference to the drawings shown above.

In an exemplary embodiment of the present invention, the fuel cell stack 5 in which a plurality of unit cells are deposited may be moved and a visual inspection may be performed, and the visually inspected fuel cell stack 5 may be transferred to the activation apparatus 1 disposed with two channels through the moving path 1a. In particular, the fuel cell stack 5 may enter onto the frame 7 (e.g., may be moved onto the frame) of the activation apparatus 1, that is, may enter into a predefined activation work space along the first guide rail 8 on the frame 7.

When the fuel cell stack 5 enters into the activation work space, in an exemplary embodiment of the present invention, the cell voltage measuring equipment 2 and the cell terminals 9 of the fuel cell stack 5 may be automatically connected using the connector connecting unit 100. In particular, the first moving body 10 may be transferred forward in an entering direction of the fuel cell stack 5 through the first actuator 11. The first moving body 10 may then be configured to move forward to the entering side of the fuel cell stack 5 along the second guide rail 13 of the frame 7, and when the first moving body 10 reaches a predetermined position, the proximity sensor 17 may be configured to sense the position and output the sensing signal to the controller 90. Then, the controller 90 may be configured to stop movement of the first moving body 10 by applying a control signal to the first actuator 11.

In the above state, in an exemplary embodiment of the present invention, the guide block 33 of the terminal guide 30 may be transferred forward to the cell terminals 9 of the fuel cell stack 5 by the second actuator 31. While the guide block 33 moves to the cell terminals 9 of the fuel cell stack 5 by the second actuator 31, the cell terminals 9 may be guided to the "V" shaped supporting grooves 35 of the guide block 33 and may be inserted into the inserting groove 37.

When the guide block 33 moves to the cell terminals 9 of the fuel cell stack 5 by the second actuator 31, the supporting pressure of the guide block 33 for the cell terminals 9 may be absorbed through the shock absorbing spring 41. In addition, when the guide block 33 contacts the connecting terminal of the second actuator 31 while continuously moving by overcoming the elastic force of the shock absorbing spring 41, the first load cell 43 may sense the contact and the sensing signal may be output to the controller 90. Then, the controller 90 may be configured to apply the control signal to the second actuator 31 and stop the operation of the second actuator 31.

As described above, when the cell terminals 9 of the fuel cell stack 5 are supported by the guide block 33 of the terminal guide 30, the probe block 63 of the connecting part 60 may be transferred in the lower direction through the third actuator 61. Then, a plurality of connector probes 65 installed on the probe block 63 may contact the cell terminals 9 aligned while supported by the guide block 33. In particular, the connector probes 65 may be connected to the cell terminals 9 via the connector head 77 installed at an end of the probe pin 73.

In addition, since the connector probe 65 may be supported through the mounting aperture 66 of the fixing plate 67, and the ring member 69 may be fixedly installed to the connector probe 65 between a pair of fixing plates 67, movement of the connector probe 65 in vertical and horizontal direction may be allowed (e.g. may not be restricted) for the probe block 63. Accordingly, even though a position deviation such as the connector probes 65 being located with a predetermined tolerance on the cell terminals 9 or when the cell terminals 9 are non-uniformly arranged, the cell terminals 9 and the connector probes 65 may be more accurately connected.

Further, since the above-described connector probes 65 may elastically support the probe pin 73 through the return spring 75 inside of the cylinder member 71, the contact force of the connector head 77 for cell terminals 9 may be increased. In addition, since the "V" shaped head groove 79 may be formed on the connector head 77 of the connector probes 65, the connector probes 65 may be allowed to move in vertically and horizontally with respect to the probe block 63 while supporting the cell terminals 9 through the head groove 79 as described above.

During such a process, in an exemplary embodiment of the present invention, the positive (+) output cable 4a of the electric load equipment 4 may be automatically connected to the positive (+) output terminal 5a disposed at a side surface of the fuel cell stack 5. In particular, in an exemplary embodiment of the present invention, first, the second moving body 110 may be transferred to a side direction of the fuel cell stack 5 by the fourth actuator 111. Accordingly, the second moving body 110 may be guided through the second guide bar 131 inserted into the first supporting block 133 and transferred in a side direction of the fuel cell stack 5. Then, a front surface of the second moving body 110 may contact (e.g., abut) a side surface of the fuel cell stack 5, and the attacher 117 made of the rubber material may be configured to support a side surface of the fuel cell stack 5. In addition, the adhering force of the second moving body for a side surface of the fuel cell stack 5 may be absorbed by the attacher 117.

As described above, when a front surface of the second moving body 110 contacts a side surface of the fuel cell stack 5, the first terminal rod 153 of the first connecting terminal set 150 may be configured to move in the rear direction of the second moving body 110 by overcoming the elastic force of the first spring 155 while supporting the positive (+) output terminal 5a through the first supporting member 163.

Additionally, the first connecting terminal 159 disposed on the first terminal rod 153 may be inserted into the terminal receptacle 5c of the positive (+) output terminal 5a, and since the outer circumference surface may form a tapered surface 161, the first connecting terminal 159 may be inserted into the terminal receptacle 5c of the positive (+) output terminal 5a. Further, the first connecting terminal 159 may be inserted into the terminal receptacle 5c of the positive (+) output terminal 5a with improved adhering force and may form a surface contact, since the elastic force of the first spring 155 may be exerted on the first terminal rod 153.

In an exemplary embodiment of the present invention, the negative (−) output cable 4b of the electric load equipment 4 may be automatically connected to the negative (−) output terminal 5d disposed at the other side surface of the fuel cell stack 5 by the fluid supply tube connecting unit 300, and the fluid supplying tube 6a of the fluid supplying equipment 6 may be automatically connected to the manifold 5m of the fuel cell stack 5. In particular, the moving block 241 may be transferred forward in the other direction of the fuel cell stack 5 along the third guide rail 213 by the fifth actuator 211. Then, the fixing block 247 fixed to the moving block 241 may be configured to contact the second load cell 249, and push and move the third moving body 210 forward in the other side direction of the fuel cell stack 5. The third moving body 210 may be guided along a pair of the third guide bars 231 inserted into the second supporting block 233, and may be configured to move in the other side direction of the fuel cell stack 5.

When trying to move the third moving body 210 back from the other side surface of the fuel cell stack 5, the moving block 241 may be moved backward from the other side surface of the fuel cell stack 5 by the fifth actuator 211. Then, the third moving body 210 may be moved backward while the stopper 243 of the moving block 241 is engaged to the stopping block 245 of the third guide bar 231.

Meanwhile, as described above, when a front surface of the third moving body 210 is moved forward and adhered to the other side surface of the fuel cell stack 5, the fixing block 247 may be configured to press the second load cell 249. Then, the second rod cell 249 may be configured to sense the contact pressure of the fixing block 247 for the third moving body 210, and output the sensing signal to the controller 90. When the pressure applied to the other side surface of the fuel cell stack 5 exceeds a predetermined reference pressure by comparing the pressure applied to the other side surface of the fuel cell stack 5 with the predetermined reference pressure, the controller 90 may be configured to terminate the operation of the fifth actuator 211 by applying the control signal to the fifth actuator 211. When a front surface of the third moving body 210 contacts a side surface of the fuel cell stack 5 the second terminal rod 253 of the second connecting terminal set 250 may be configured to move in the rear direction of the third moving body 210 by overcoming the elastic force of the second spring 255 while supporting the negative (−) output terminal 5d through the second supporting member 263.

The second connecting terminal 259 disposed on the second terminal rod 253 may be inserted into the terminal receptacle 5e of the negative (−) output terminal 5d, and since the outer circumference surface may form a tapered surface 261, the second connecting terminal 259 may be inserted into the terminal receptacle 5e of the negative (−) output terminal 5d. The second connecting terminal 259 may be inserted into the terminal receptacle 5e of the negative (−) output terminal 5d with substantial adhering force and may form surface contact, since the elastic force of the second spring 255 may be exerted on the second terminal rod 253.

Furthermore, the tube connecting part 270 of the third moving body 210 may be connected to the manifold 5m of the fuel cell stack 5, while the second connecting terminal 259 of the second connecting terminal set 250 may be connected to the negative (−) output terminal 5d of the fuel cell stack 5. After the fluid supply tube 6a of the fluid supply equipment 6 is connected to the manifold 5m of the fuel cell stack 5 via the tube connecting part 270, the air supplied from the air supply source 291 of the air-tightness testing part 290 may be injected to the fluid supply apertures of the tube connecting part 270.

The air pressure supplied from the air supply source 291 may be regulated with a predetermined pressure using the air pressure regulator 293, and the flow rate of the supplied air may be measured by the flow meter 295 and may be regulated with a predetermined flow rate based on the measured value. The pressure sensor 297 of the air-tightness testing part 290 may be configured to sense the air pressure exerted inside of the fuel cell stack 5, and output the sensing signal to the controller 90. Accordingly, the controller 90 may be configured to determine the failure of air-tightness of the fuel cell stack 5 by comparing the predetermined air pressure inside the fuel cell stack 5 with actual air pressure inside the fuel cell stack 5 based on the sensing signal.

Additionally, automatic connection may be available between the cell voltage measuring equipment 2 used to measure an average cell voltage of the fuel cell stack 5 and cell terminals 9 of the fuel cell stack 5 using the connector connecting unit 100. Further, the positive (+) output cable 4a of the electric load equipment 4 may be automatically connected to the positive (+) output terminal 5a disposed at a side surface of the fuel cell stack 5.

In an exemplary embodiment of the present invention, the negative (−) output cable 4b of the electric load equipment 4 may be automatically connected to the negative (−) output terminal 5d disposed at the other side surface of the fuel cell stack 5 by the fluid supply tube connecting unit 300, and the fluid supplying tube 6a of the fluid supplying equipment 6 may be automatically connected to the manifold 5m of the fuel cell stack 5. In such a state, air and cooling water supplied through the fluid supply tube 6a of the fluid supply equipment 6 may be provided to the fuel cell stack 5 through the tube connecting part 270 of the fluid supply tube connecting unit 300.

Then, the electrical energy may be generated in the fuel cell stack 5 through the electro-chemical reaction between hydrogen and air. The electrical energy may be applied to the electric load equipment 4 through the positive (+) output terminal 5a and the positive (+) output cable 4a of the fuel cell stack 5 electrically connected by the output cable connecting unit 200, and the negative (−) output terminal 5d and the negative (−) output cable 4b of the fuel cell stack 5 electrically connected by the fluid supply tube connecting unit 300.

During the process of applying electricity generated from the fuel cell stack 5 to the electric load equipment 4, the electrical connection between the cell terminals 9 of the fuel cell stack 5 and the connector probes 65 of the connector connecting unit 100 may be displayed (e.g., may be output) by the display 80. In other words, by electrically connecting the connector probes 65, the guide block 33, and the display part 80, and by applying power to the display 80 using the controller 90, the LED bulb 81 of the display part 80 may be configured to emit light.

When the connector probes 65 and cell terminals 9 do not properly contact (e.g., are not connected or are insufficiently connected) or the unit battery is faulty, since electric power is not applied to the LED bulb 81 of the display 80, the faulty state of the corresponding cell may be displayed. Accordingly, the connection between the connector probes 65 and each cell terminal 9 may be displayed by light emitted from the LED bulb 81 of the display part 80.

In an exemplary embodiment of the present invention, since the cell voltage measuring equipment 2 and the cell terminals 9 of the fuel cell stack 5 may be connected using the connector connecting unit 100, the average cell voltage of the fuel cell stack 5 may be measured by the cell voltage measuring equipment 2. Accordingly, the average cell voltage value measured using the cell voltage measuring equipment 2 may be transmitted to the controller 90, and the controller 90 may be configured to display a failure of the fuel cell stack 5 by comparing and determining the average cell voltage of the fuel cell stack 5 measured using the cell voltage measuring equipment 2 with the reference voltage.

The activation apparatus 1 of the fuel cell stack according to an exemplary embodiment of the present invention as described so far enables an activation process of the fuel cell stack and performance evaluation to be unmanned and automated by the connector connecting unit 100, the output cable connecting unit 200, and the fluid supply tube connecting unit 300. In addition, in an exemplary embodiment of the present invention, since the voltage measuring connector, the output cable, and the fluid supply tube may be simultaneously connected in an automated process, the system may more flexibly respond to the process of mass production of automatic assembly of vehicles equipped with the fuel cell.

Furthermore, since the output cable and the fluid supply tube may be simultaneously connected in an automated process the workability in the activation process of the fuel cell stack may be improved, damage to the fuel cell stack and an electric shock accident of a worker may be prevented, and the air-tightness with the fuel cell stack may be secured when supplying fluid.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

1 . . . activation apparatus
1a . . . transferring path
2 . . . cell voltage measuring equipment
3 . . . carrier
4 . . . electric load equipment
4a . . . positive (+) output cable
4b . . . negative (−) output cable
5 . . . fuel cell stack
5a . . . positive (+) output terminal
5b . . . end plate
5c, 5e . . . terminal receptacle
5d . . . negative (−) output terminal
5m . . . manifold
6 . . . fluid supply equipment
6a . . . fluid supply tube
7 . . . frame
8 . . . first guide rail 9 . . . cell terminal
10 . . . moving body
11 . . . first actuator
13 . . . second guide rail
17 . . . proximity sensor
30 . . . terminal guide
31 . . . second actuator
33 . . . guide block
35 . . . supporting groove
37 . . . inserting groove
39 . . . first guide bar
41 . . . shock absorbing spring
43 . . . first load cell
60 . . . connecting part
61 . . . third actuator
63 . . . probe block
65 . . . connector probe
66 . . . mounting aperture
67 . . . fixing plate
69 . . . ring member
71 . . . cylinder member
73 . . . probe pin
75 . . . return spring
77 . . . connector head
79 . . . head groove
80 . . . display part
81 . . . LED bulb
90 . . . controller
100 . . . connector connecting unit
110 . . . second moving body
111 . . . fourth actuator
115 . . . operating cylinder
117 . . . attach
131 . . . second guide bar
133 . . . first supporting block
150 . . . first connecting terminal set
151 . . . first cable connecting member
153 . . . first terminal rod
155 . . . first spring
157, 257 . . . penetration aperture
159 . . . first connecting terminal
161, 261 . . . tapered surface
163 . . . first supporting member
200 . . . output cable connecting unit
210 . . . third moving body
211 . . . fifth actuator
213 . . . third guide rail
215 . . . motor
231 . . . third guide bar
233 . . . second supporting block
241 . . . moving block
243 . . . stopper
245 . . . stopping block
247 . . . fixing block
249 . . . second load cell
250 . . . second connecting terminal set
251 . . . second cable connecting member
253 . . . second terminal rod
255 . . . second spring
259 . . . second connecting terminal
263 . . . second supporting member
270 . . . tube connecting part
290 . . . air-tightness test part
291 . . . air supply source
293 . . . air pressure regulator
295 . . . flow meter
297 . . . pressure sensor
300 . . . supply tube connecting unit
400 . . . display

What is claimed is:

1. An activation apparatus of a fuel cell stack for performing activating and evaluating performance of the fuel cell stack while the fuel cell stack enters a frame, the apparatus comprising:
an output cable connecting unit movably installed back and forth along a side direction of the fuel cell stack in a motor operated manner, and configured to connect an output cable with the fuel cell stack,
wherein the output cable connecting unit, includes:
a moving body movably installed back and forth along a side direction of the fuel cell stack by an actuator, and
a pair of connecting terminal sets elastically installed on the moving body and connected to an output terminal of the fuel cell stack,
wherein the connecting terminal set includes:
a cable connecting member fixedly installed to the moving body and connected to electric load equipment via an output cable;
a terminal rod that protrudes outwardly from the cable connecting member and is movably installed back and forth in a side direction of the fuel cell stack, wherein a connecting terminal is installed at the protruding end of the terminal rod; and
a spring installed inside of the cable connecting member and configured to exert an elastic force to the terminal rod.

2. The activation apparatus of a fuel cell stack of claim 1, wherein on the moving body, a pair of attachers are installed to support a side surface of the fuel cell stack.

3. The activation apparatus of a fuel cell stack of claim 2, wherein the attachers have a block shape and are made of a rubber material.

4. The activation apparatus of a fuel cell stack of claim 1, wherein the connecting terminal is inserted into a terminal receptacle disposed at a side surface of the fuel cell stack, and forms a tapered outer circumference.

5. The activation apparatus of a fuel cell stack of claim 4, wherein a supporting member of a disk shape that supports the output terminal of the fuel cell stack is installed at the end of the protrusion of the terminal rod.

6. The activation apparatus of a fuel cell stack of claim 1, wherein the actuator includes an operating cylinder connected to the moving body.

7. The activation apparatus of a fuel cell stack of claim 6, wherein the moving body is movably installed back and forth to the frame by a pair of guide bars.

8. The activation apparatus of a fuel cell stack of claim 7, wherein the guide bar is inserted into a pair of supporting blocks disposed on the frame and is configured to guide a movement of the moving body.

9. The activation apparatus of a fuel cell stack of claim 1, wherein the output cable connecting unit connects a positive (+) cable of electric load equipment to a positive (+) output terminal disposed at a side of the fuel cell stack.

10. The activation apparatus of a fuel cell stack of claim 9, wherein a negative (−) output cable of electric load equipment is connected to a negative (−) output terminal disposed at another side of the fuel cell stack using a fluid supply tube connecting unit to supply fluid to the fuel cell stack.

11. The activation apparatus of a fuel cell stack of claim 10, wherein the fluid supply tube connecting unit includes:

a moving body that is movably installed to the frame back and forth in the other side direction of the fuel cell stack by an actuator.

* * * * *